United States Patent
Wilding et al.

(10) Patent No.: US 11,243,873 B2
(45) Date of Patent: Feb. 8, 2022

(54) CONCURRENCY TESTING

(71) Applicant: salesforce.com, inc., San Francisco, CA (US)

(72) Inventors: Mark Wilding, Issaquah, WA (US); Punit B. Shah, Castro Valley, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/945,399

(22) Filed: Jul. 31, 2020

(65) Prior Publication Data
US 2020/0364136 A1 Nov. 19, 2020

Related U.S. Application Data

(63) Continuation of application No. 15/787,470, filed on Oct. 18, 2017, now Pat. No. 10,733,083.

(51) Int. Cl.
*G06F 11/36* (2006.01)
*G06F 9/54* (2006.01)
(Continued)

(52) U.S. Cl.
CPC ...... *G06F 11/3688* (2013.01); *G06F 11/3636* (2013.01); *G06F 11/3644* (2013.01);
(Continued)

(58) Field of Classification Search
CPC ............. G06F 11/3636; G06F 11/3644; G06F 11/3648; G06F 11/3664; G06F 11/3672;
(Continued)

(56) References Cited

U.S. PATENT DOCUMENTS 5,093,914 A * 3/1992 Coplien .............. G06F 11/3644
714/E11.21
6,009,269 A 12/1999 Burrows et al.
(Continued)

OTHER PUBLICATIONS

Man Cao, "Efficient, Practical Dynamic Program Analyses for Concurrency Correctness," ProQuest Dissertations Publishing, 2017; https://dialog.proquest.com/professional/docview/1970741687/1706F2659DF5B96AA02/ (Year: 2017), 176 pages.
(Continued)

*Primary Examiner* — Joseph O Schell
(74) *Attorney, Agent, or Firm* — Kowert, Hood, Munyon, Rankin & Goetzel, P.C.

(57) ABSTRACT

Techniques are disclosed relating to testing application code. A computer system, in various embodiments, receives application code to be tested by the computer system and separate information defining actions to be performed at specified locations within the application code. In various embodiments, the computer system executes the application code in a test environment in which the actions defined by the separate information are retrieved and performed by a plurality of threads of the application code at the specified locations to control flow of the plurality of threads through the application code. In some embodiments, a first one of the plurality of threads is operable to perform at least one of the actions to control the flow of a second one of the plurality of threads.

20 Claims, 9 Drawing Sheets

(51) Int. Cl.
*G06F 9/48* (2006.01)
*G06F 9/52* (2006.01)

(52) U.S. Cl.
CPC ...... *G06F 11/3648* (2013.01); *G06F 11/3664* (2013.01); *G06F 11/3672* (2013.01); *G06F 9/485* (2013.01); *G06F 9/522* (2013.01); *G06F 9/542* (2013.01)

(58) Field of Classification Search
CPC ........ G06F 11/3688; G06F 9/54; G06F 9/541; G06F 9/542; G06F 9/52; G06F 9/522; G06F 9/4484; G06F 9/3009
See application file for complete search history.

(56) References Cited

U.S. PATENT DOCUMENTS

| | | | |
|---|---|---|---|
| 6,457,152 | B1 | 9/2002 | Paley et al. |
| 7,028,119 | B2 | 4/2006 | Hue |
| 7,512,950 | B1 | 3/2009 | Marejka |
| 7,617,487 | B2 * | 11/2009 | Kilian ................. G06F 11/3648 714/38.14 |
| 8,276,021 | B2 | 9/2012 | Dern et al. |
| 8,336,056 | B1 * | 12/2012 | Gadir .................... G06F 9/5027 718/104 |
| 8,930,907 | B2 | 1/2015 | Burckhardt et al. |
| 9,201,802 | B1 | 12/2015 | Armangau et al. |
| 9,529,695 | B2 | 12/2016 | Tripp |
| 10,191,835 | B2 * | 1/2019 | Gritter ................ G06F 11/3636 |
| 2004/0049655 | A1 * | 3/2004 | Allison ................... G06F 9/544 712/200 |
| 2004/0064816 | A1 * | 4/2004 | Alverson ................ G06F 9/485 718/102 |
| 2005/0055594 | A1 | 3/2005 | Doering et al. |
| 2005/0177775 | A1 | 8/2005 | Qadeer et al. |
| 2006/0161762 | A1 * | 7/2006 | Eisen .................... G06F 9/3844 712/233 |
| 2008/0209436 | A1 | 8/2008 | Agha et al. |
| 2008/0271042 | A1 | 10/2008 | Musuvathi et al. |
| 2011/0314338 | A1 | 12/2011 | Erickson et al. |
| 2018/0032423 | A1 | 2/2018 | Bull et al. |

OTHER PUBLICATIONS

Mathias Guenter Ricken, "A Framework for Testing Concurrent Programs," ProQuest Dissertations Publishing, 2008; https://dialog.proquest.com/professional/docview/304509594/1706F27948D50C4E DA3/ (Year: 2008), 148 pages.

* cited by examiner

```
                Function                          100
                 710
                  )
              Transaction (Account account, Double value) { sCodePoint(0) ─ 711
                               Control Point
                 Getlock()

Update Account Balance (account, value)

sCodePoint(10) ─ 712
                                Control Point
                 Release Lock()
              }
```

|  |  | Hash Table 225 |
|---|---|---|
| Index | Value | |
| 0 | SCONTROL thread 2 ON CODE POINT Transaction: 0 WAIT FOR COUNTER EQUAL 1; | ← Action 115 |
| 1 | SCONTROL thread 1 ON CODE POINT Transaction: 10 INCREMENT COUNTER AND SLEEP 10s; | |
| ⋮ | ⋮ | |

FIG. 7

Function 810 — Transaction (Account account, Double value) {

....

Update Account Balance (account, value)
....

}

Function 820 — Update Account Profile (Account account, String name) { f = OpenFile(account)

WriteToFile(f, name)

sCodePoint(0) — Control Point 825

CloseFile(f)

}

100

Hash Table 225A

| Index | Value |
|---|---|
| 0 | SCONTROL thread 1 ON CODE POINT Transaction: Exit INCREMENT COUNTER; |
| 1 |  |
| . | . |

Action 115A

Hash Table 225B

| Index | Value |
|---|---|
| 0 |  |
| 1 | SCONTROL thread 2 ON CODE POINT Update Account Profile: 0 WAIT FOR COUNTER EQUAL 1; |
| . | . |

Action 115B

CONCURRENCY TESTING

The present application is a continuation of U.S. application Ser. No. 15/787,470 filed Oct. 18, 2017, which is incorporated by reference in the present application in its entirety.

BACKGROUND

Technical Field

This disclosure relates generally to concurrency testing and, more specifically, to testing conditions involving threads.

Description of the Related Art

A database system typically implements a multithreading model in which multiple threads work together to accomplish a task. These threads may exist within one process of the database system, executing concurrently and also operating on similar resources to each other. A database system may further implement a thread scheduling algorithm that swaps between threads, allowing each thread to be executed by a processor for some set amount of time. Because these threads operate on similar resources and are swapped around by a thread scheduling algorithm, situations may arise that are detrimental to the operation of a database system.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "processor configured to execute an instance of a debugger application" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having four threads, the terms "first" and "second" threads can be used to refer to any two of the four threads.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

Since threads may operate on similar resources, conditions may arise in which one thread affects the operations of another thread, including outcomes produced by the other thread. For example, one thread may obtain a lock (to prevent other threads from entering a block of code) and then begin performing operations while the other threads wait for the lock to be returned. In such an example, the thread with the lock may timeout and thus fail to return the lock, causing the other threads to wait indefinitely. A developer may design the others threads to retreat when a timeout occurs, but may have no way to test for such a condition where the test is deterministic.

In some cases, due to the design of thread scheduling algorithms, multiple threads may make concurrent changes to a data record where the result of the changes depends on the order in which the threads were scheduled—these are often called race conditions. For example, a problem may occur in a check-then-act scenario in which a first thread checks whether a value satisfies a condition and then acts on the value, but before it can act on the value, the thread scheduling algorithm swaps to a second thread that then acts on the value. When the thread scheduling algorithm swaps back to the first thread, the thread will act on the value, but this may produce a different result than would otherwise have happened had the second thread acted on the value after the first thread.

One approach for testing these conditions is to place a system under stress in which the system must process a workload that is multiple factors more than what the system was designed for. Assuming a system is designed to process a million transactions per minute, then a test may involve, for example, forcing the system to process ten million transactions per minute. The assumption is that the test (if run long enough) will go through most if not all of the conditions that may arise as a result of thread concurrency. This approach has its downsides as there is no guarantee that all conditions will be tested and any problems that do occur may be hard to reproduce. For example, a developer may wish to test code that he or she has developed to handle a problematic scenario, but under the stress test approach, the problematic scenario may not occur during the time the test is run.

The present disclosure describes techniques for testing conditions, which involve the interplay of concurrent threads, in a manner that overcomes some of the downsides of the prior approaches. In various embodiments described below, a system executes application code in a test environment in which actions defined separately from the code are retrieved and performed by threads at specified locations within the code. In such embodiments, the system may maintain a counter having a value that is accessible to the threads and usable to control the flow of the threads through the application code. In some cases, for example, a thread may wait until the counter reaches a certain value before continuing through the application code. In such cases, another thread may retrieve and perform an action to cause the value to be modified, allowing the other thread to continue. In this manner, a developer may be able to control the progression of one thread through the application code based on the progression of another thread through the code. In various embodiments, the system maintains a table storing actions that may be performed by threads at specified locations within the code. Upon reaching a specified location, a thread may attempt to look-up any actions in the table that correspond to the location and then perform those actions. This may allow developers to test for certain conditions or to test code that they have developed to handle certain conditions. Returning to the timeout example above, a developer may cause the thread with the lock to wait until a counter reaches a certain value (an action), which may not happen. In doing so, a developer may simulate a timeout on the thread and thus test whether the other threads (waiting for the lock) properly retreat in order to go perform other operations.

A system implementing these techniques may be advantageous over the stress test approach and other prior approaches as the system may be able to test conditions involving thread concurrency in a more deterministic way. Returning again to the timeout example above, under the stress test approach, the developer has to hope that one of the testing iterations involves the thread with the lock timing out; however, this may not occur during the time this test is run. The techniques described in the present disclosure, however, allow a developer to create, for example, a series of events that are guaranteed to happen in a particular order, removing randomness. For example, under the techniques described in the present disclosure, the developer may force the thread with the lock to time out. In this manner, a developer may force conditions involving thread interplay (e.g., race conditions) to see how their code handles such conditions.

Figure 1:
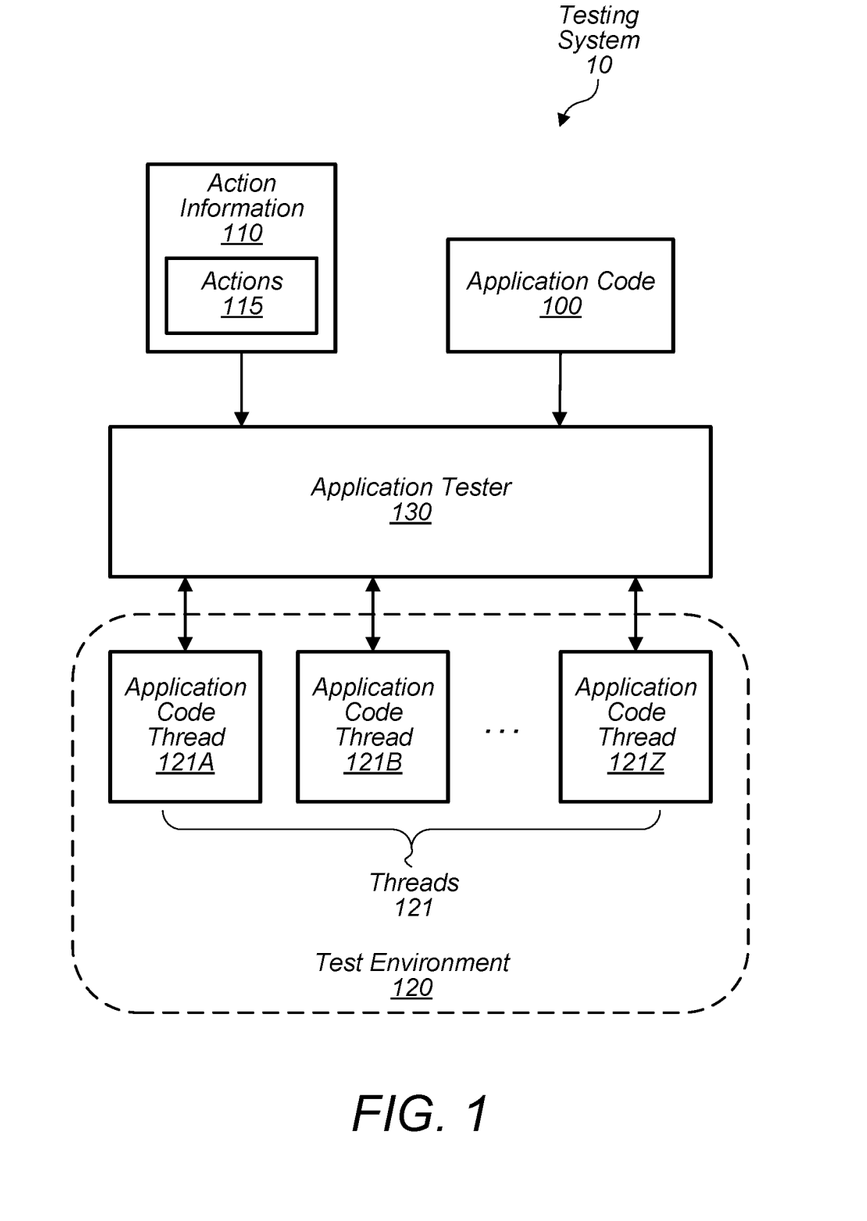
FIG. 1 is a block diagram illustrating exemplary elements of a database system that facilitate testing of application code, according to some embodiments.

Turning now to FIG. 1, a block diagram of one embodiment of a testing system 10 is shown. In the illustrated embodiment, testing system 10 includes application code 100, action information 110, a test environment 120, and an application tester 130. As shown, action information 110 includes actions 115, and test environment 120 includes application code threads 121A-Z. Although not shown, a user may provide application code 100 and action information 110 to testing system 10 through an interface of system 10 or a separate user device. In some embodiments, testing system 10 may be implemented differently than shown. For example, in some embodiment, environment 120 includes multiple processes that each have one or more threads 121.

Application code 100, in various embodiments, is a set of program instructions that are executable to implement a software routine such as a database application. Code 100 may be written in any suitable programming language such as C, C++, Java, Ruby, Python, Apex, etc. In various embodiments, code 100 includes functions/methods having control points that are usable to cause threads 121 implementing code 100 to perform particular actions 115. These control points may be written into code 100 by a user such as a developer or a tester. In some embodiments, each of these control points is associated with an identifier (e.g., a key) that corresponds to a particular set of actions 115. Accordingly, upon reaching a control point, a thread 121 may attempt to locate a particular set of actions 115 using the identifier associated with the reached point. Thereafter, the thread 121 may perform the particular set of actions 115. (In some embodiments, each thread 121 may attempt to locate an action upon reaching the same particular control point as another thread 121, and each thread 121 may locate a different action 115 than another thread 121 for the same particular control point.) In some embodiments, control points are compiled out when code 100 is executed in a normal environment (e.g., production). In other embodiments, control points may not be compiled out during normal execution.

Action information 110, in various embodiments, includes data such as actions 115 that affect the operation of the software routines implemented via code 100. Actions 115, in particular, may be program instructions that are executable to affect the progression of threads 121 through the methods/functions included in code 100. Actions 115 may include incrementing a value of a counter, waiting until the value of the counter satisfies a condition (e.g., greater than, less than, etc.) before resuming execution, sleeping for a defined interval of time, waking-up another thread 121, throwing an error, corrupting memory etc. In addition to specifying actions 115, in some embodiments, action information 110 further indicates the control points to which actions 115 are linked or associated with. For example, an action 115 may specify that a particular thread 121 is to update the value of a counter upon exiting a function called foo. In some embodiments, code 100 and information 110 are distinct from each other—e.g., written in different files. Similar to code 100, information 110 may be defined by a user such as a developer or a tester. As will be discussed below with respect to FIGS. 2 and 3, in some embodiments, actions 115 are stored in a hash table that is accessible to threads 121.

Test environment 120, in various embodiments, is a software routine, hardware, or a combination thereof that facilitates the execution of threads 121A-Z that implement code 100. For example, test environment 120 may include multiple processors and a scheduler responsible for scheduling which threads 121 are to be executing on those processors and which threads 121 are to wait. In various embodiments, environment 120 spawns threads 121 in response to a request from application tester 130. Threads 121 executing within test environment 120 may communicate with tester 130 to locate and retrieve actions 115 along with other data stored at tester 130—e.g., the value of a counter. In various embodiments, environment 120 is representative of an output generated by tester 130.

Application tester 130, in various embodiments, is a software routine, hardware, or a combination thereof that facilitates the testing of code 100. Tester 130 may test code 100 by causing environment 120 to spawn and execute one or more threads 121 implementing code 100 and by enabling these threads 121 to access actions 115 stored by tester 130. For example, tester 130 may be part of a debugger application. In various embodiments, tester 130 receives code 100 and information 110 from a user via an interface of system 10 or a separate user device. In response to a request to test code 100, tester 130 may populate a hash table with actions 115 that may be accessible to the one or more threads 121 that are spawned by test environment 120. In some embodiments, tester 130 instantiates a counter to have a value that is accessible to the one or more threads 121 and usable to control the flow of those threads through code 100.

In various embodiments, tester 130 executes application code 100 in environment 120 in which actions 115 that are defined by information 110 are retrieved and performed by threads 121 at specified locations. Actions 115 may be performed to control the flow of threads 121 through code 100. In some embodiments, one thread 121 performs an action 115 to control the flow of another thread 121. Controlling the flow of threads 121 through code 100 may be done in various ways. In some embodiments, a counter value is used in which threads 121 progress through code 100 based on whether the value satisfies a particular condition. This counter approach is discussed in detail below with regards to FIG. 2. In some embodiments, semaphores are used to control the progression of threads 121 through code 100. Other mechanisms, however, may be used to control flow. For example, a thread 121 may wait at a control point until: a certain file is created, modified, or deleted; a particular state is reached within a class object; a given amount of time has elapsed; etc. In some embodiments, multiple conditions are used to control threads 121. For example, a particular thread 121 may wait at a control point until a counter value reaches a certain value and a certain file has been created. In some embodiments, tables are used for storing actions 115 that pertain to these various approaches. As such, when a particular thread 121 reaches a control point, it may consult the tables for any actions tied to that point. These tables are discussed in detail below with regards to FIG. 3.

These approaches may be advantageous over prior approaches as they may allow developers to control threads at a more granular level and more easily test for particular conditions involving thread interplay. As an example, a developer may write actions 115 that cause a particular thread 121 to timeout, which may possibly affect the operations of other threads 121. As such, the developer may observe these affects and know that they are tied to the particular thread 121. In another example, a developer may write actions 115 to keep a thread 121 from progressing through code 100 until another thread 121 has reached some point within code 100. Accordingly, the techniques discussed throughout the present disclosure may be used to precisely arrange thread interleaving.

Figure 2:
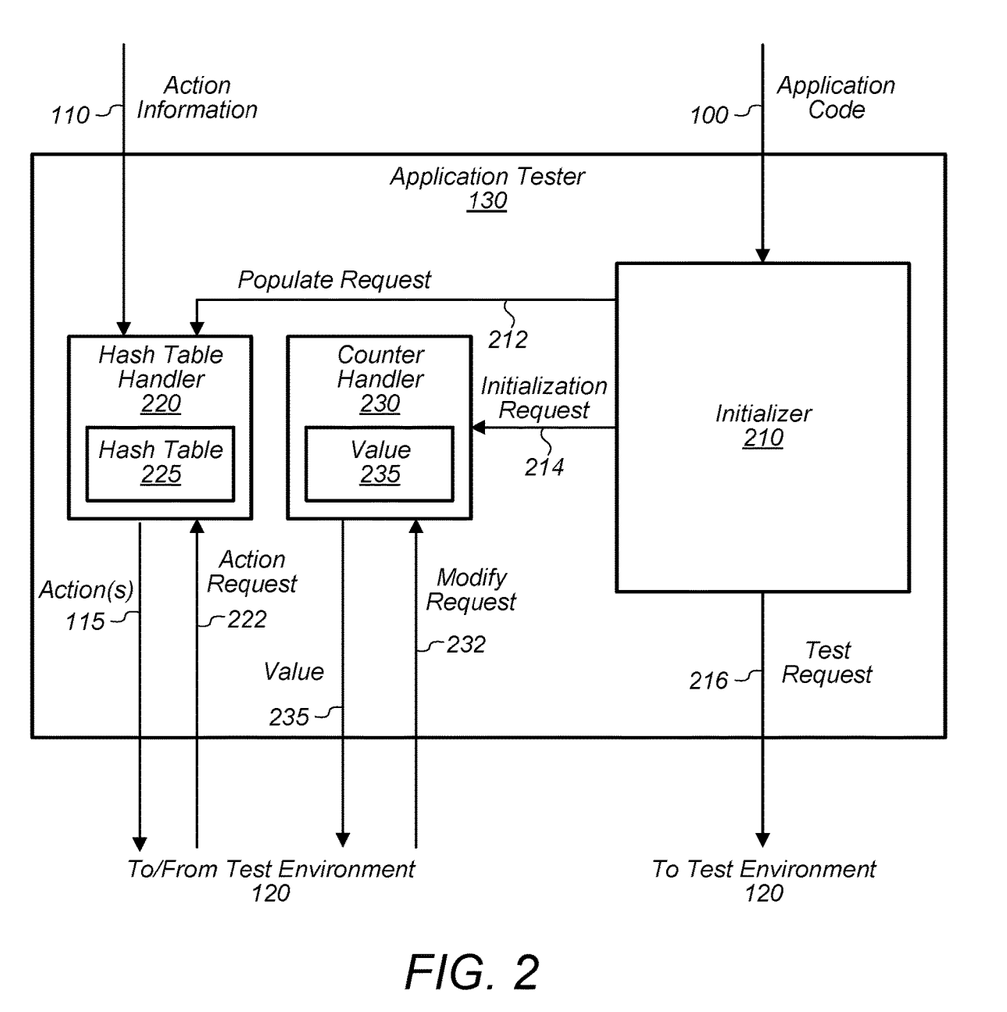
FIG. 2 is a block diagram illustrating exemplary elements of an application tester that tests application code, according to some embodiments.

Turning now to FIG. 2, a block diagram of one embodiment of an application tester 130 is shown. In the illustrated embodiment, application tester 130 includes an initializer 210, a hash table handler 220, and a counter handler 230. Also as shown, hash table handler 220 includes a hash table 225, and counter handler 230 includes a value 235. Although not shown, tester 130 may communicate with user devices to receive code 100 and information 110. In various embodiments, application tester 130 may be implemented differently than shown—e.g., handler 220 may include multiple hash tables 225 that are each associated with a different thread 121, hash table 225 may be located elsewhere in system 10, etc.

Initializer 210, in various embodiments, facilitates the testing of application code 100 by initializing various components of system 10 including handler 220, handler 230, and test environment 120. In response to receiving code 100 and/or information 110, in some embodiments, initializer 210 may issue a populate request 212 and an initialization request 214 to hash table handler 220 and counter handler 230, respectively. In other embodiments, initializer 210 may issue the requests in response to a request from a user to do so. Request 212 may include information 110 and may cause handler 220 to populate table 225 with actions 115 that are included in information 110. Request 214 may specify a particular value 235 and may cause counter handler 230 to initialize a counter to have the particular value 235. In addition to issuing requests 212 and 214, in various embodiments, initializer 210 causes test environment 120 to spawn threads 121 (by issuing test request 216) that implement code 100 and are operable to retrieve and perform actions 115 from table 225. (Initializer 210 may communicate with an operating system (OS) of system 10 in order to spawn threads 121.)

Hash table handler 220, in various embodiments, facilitates the population of a hash table 225 with actions 115 included in information 110. In some embodiments, handler 220 receives information 110 from a component (e.g., a user interface) outside of tester 130; in other embodiments, handler 220 receives information 110 from initializer 210 in request 212. As touched on above, handler 220 may populate table 225 in response to request 212 from initializer 210. In various embodiments, table 225 is accessible to threads 121 for looking-up and retrieving actions 115 in response to reaching a control point in code 100. As such, handler 220 may receive an action request 222 for any actions associated with the reached control point. Request 222 may include, for example, an identifier associated with the control point. In response to request 222, handler 220 may locate any actions 115 in table 225 and return them to the requesting thread 121. As will be discussed in more detail below with respect to FIG. 3, handler 220 may derive indexes for inserting actions into table 225 by performing a hash derivation function on identifiers associated with control points. (In some embodiments, handler 220 includes multiple hash tables 225 such that each thread 121 has its own table 225. This may allow a control point to correspond to multiple actions 115. As such, the particular actions 115 returned by handler 220 may depend on the thread 121 requesting the actions.)

Counter handler 230, in various embodiments, facilitates initialization of a counter to have a particular value 235 that is accessible to threads 121. As noted above, value 235 may be used to control whether a particular thread 121 continues progressing through code 100. For example, a particular thread 121 may reach a control point that corresponds to an action 115 requiring the particular thread 121 to wait until value 235 satisfies a condition such as reaching a particular value. The particular thread 121 may enter a loop (e.g., while loop) in which it iteratively checks whether value 235 satisfies the condition. If value 235 is never updated, then the particular thread 121 may be prevented from passing the control point (i.e., thread 121 may cease progressing through application code 100) in the particular function/method that includes the point. In some instances, the counter may allow for a back-and-forth between threads 121 where a first thread 121 may execute a certain block of code, stop, and release a second thread 121, which may then execute a certain block of code, stop, and release the first thread. As such, these threads 121 may be in a progress-stop-and-release process that is at a very granular level.

In various embodiments, handler 230 initializes or instantiates the counter to have a particular value 235 in response to request 214 from initializer 210. Thereafter, handler 230 may receive a modify request 232 from a particular thread 121 spawned in test environment 120. Request 232 may specify a particular value 235 and may be received through an application programing interface (API) employed by application tester 130. As such, handler 230 may modify the counter to have the particular value 235. In addition to receiving request 232, handler 230 may receive a request (not shown) for value 235 and in response to such a request, return value 235 to the requesting thread 121. The requesting thread 121 may use the returned value 235 to determine whether to continue progressing (exit the loop) through application code 100. (In some embodiments, value 235 may be returned to a thread scheduler that determines whether to release a particular thread 121 to a processor based on the returned value 235.)

Figure 3:
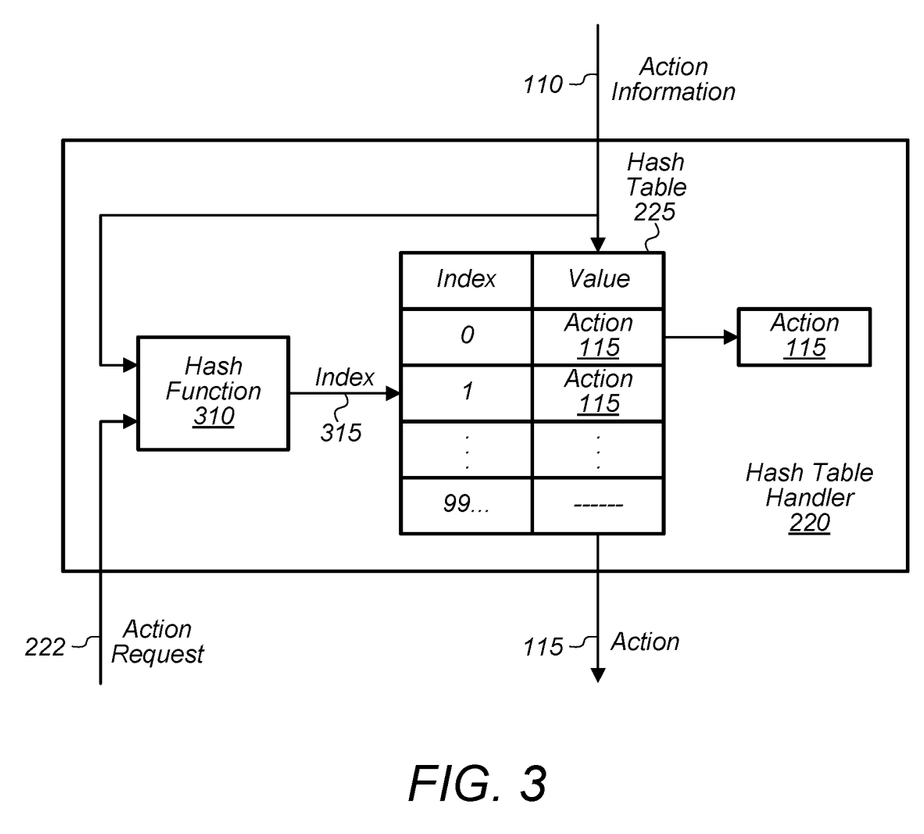
FIG. 3 is a block diagram illustrating exemplary elements of hash table handler that store actions in a hash table, according to some embodiments.

Turning now to FIG. 3, a block diagram of one embodiment of a hash table handler 220 is shown. As mentioned above, hash table handler 220 may maintain hash table 225 and further populate table 225 with actions 115. In the illustrated embodiment, handler 220 includes a hash function 310 and a hash table 225. As mentioned above, handler 220 may include multiple hash tables 225 (in some cases, a separate hash table 225 for each spawned thread 121). In various embodiments, handler 220 may be implemented differently than shown—e.g., action information 110 is included in request 212.

Hash function 310, in various embodiments, facilitates the derivation of an index value 315 for a particular entry in hash table 225 that may be used to store one or more actions 115. Function 310 may be any suitable hashing algorithm such as any member of the secure hash algorithm (SHA) family, the Pearson hash function, the Jenkins hash function, the MD5 function, the Fowler-Noll-Vo hash function, etc. In some embodiments, the indexes derived using function 310 may be based on identifiers associated with the control points that correspond to the actions 115 being inserted into hash table 225. An identifier may be based, in part, on the method/function that includes the corresponding control point in addition to where the control point is located within the method/function. For example, an identifier may be a 64-bit value where the upper 32 bits represent the name of the function (or some representation of the function) and the lower 32 bits represent the location of the control point within the function.

Hash table 225, in various embodiments, stores actions 115 based on index values 315 derived using function 310. In some embodiments, handler 220 receives information 110 and passes a portion of the information that includes control point information to function 310. Function 310 may output an index value 315 at which the corresponding actions 115 are stored in hash table 225. Because a control point may produce the same index value 315, but correspond to different actions 115 for each thread 121, in various embodiments, handler 220 includes multiple tables 225. Each table 225 may be associated with a thread 121. Handler 220 may use information about a particular thread 121 (e.g., a thread ID) to select a particular hash table 225 for storing the particular actions 115 that correspond to both the control point and the particular thread 121. Each entry in table 225 may store one or more actions 115 as a linked list where the entry in the list includes a pointer to a subsequent action 115 if there is one. In some cases, the actions 115 may be stored in an array without pointers. In some embodiments, handler 220 receives an action request 222 from a particular thread 121 for any actions associated with an identifier included in the request. Handler 220 may apply function 310 to the identifier to derive an index value 315 and return any actions 115 stored in the entry corresponding to the index value 315.

Figure 4:
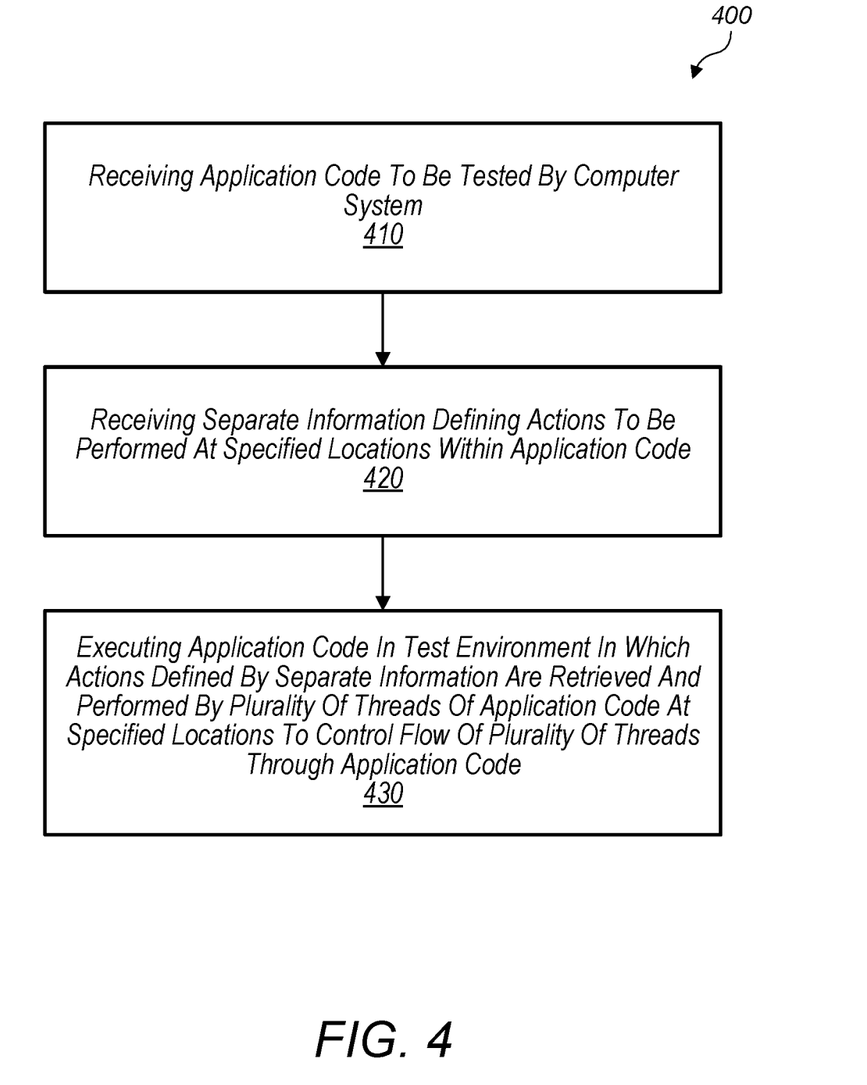
FIG. 4-6 are flow diagrams illustrating exemplary methods for testing application code, according to some embodiments.

Turning now to FIG. 4, a flow diagram of a method 400 is shown. Method 400 is one embodiment of a method performed by a computer system such as system 10 to test application code (e.g., code 100). When a user wishes to test conditions that involve thread interplay, the user may cause the computer system to perform the steps of method 400. In various embodiments, method 400 includes additional steps—e.g., initializing a table (e.g., table 225) for storing actions (e.g., actions 115) to be performed by threads (e.g., threads 121) implementing the application code.

Method 400 begins in step 410 with a computer system receiving application code to be tested. In step 420, the computer system receives separate information (e.g., information 110) defining actions (e.g., actions 115) to be performed at specified locations (e.g., control points) in the application code. In various embodiments, the computer system stores a first value (e.g., value 235) accessible to a plurality of threads (e.g., threads 121) implementing the application code. The first value may be used to control the flow of the plurality of threads through the application code. In various embodiments, the computer system maintains a table accessible to the plurality of threads and usable to store actions that are retrievable by the threads.

In step 430, the computer system executes the application code in a test environment (e.g., test environment 120) in which the actions defined by the separate information are retrieved and performed by the plurality of threads of the application code at the specified locations in order to control the flow of the plurality of threads through the application code. In some instances, a first thread of the plurality of threads may perform at least one of the actions to control the flow of a second thread of the plurality of threads. For example, the first thread may retrieve at least one action from the maintained table and perform it to request (e.g., modify request 232) that the first value be updated to a second value. The computer system may update the first value to the second value in response to receiving the request from the first thread. The second thread may retrieve the second value, determine that the value satisfies a condition (e.g., equal to), and then start progressing through the application code. (In some embodiments, the computer system executes the application in a normal environment and thus compiles the application code without the specified locations.)

Figure 5:
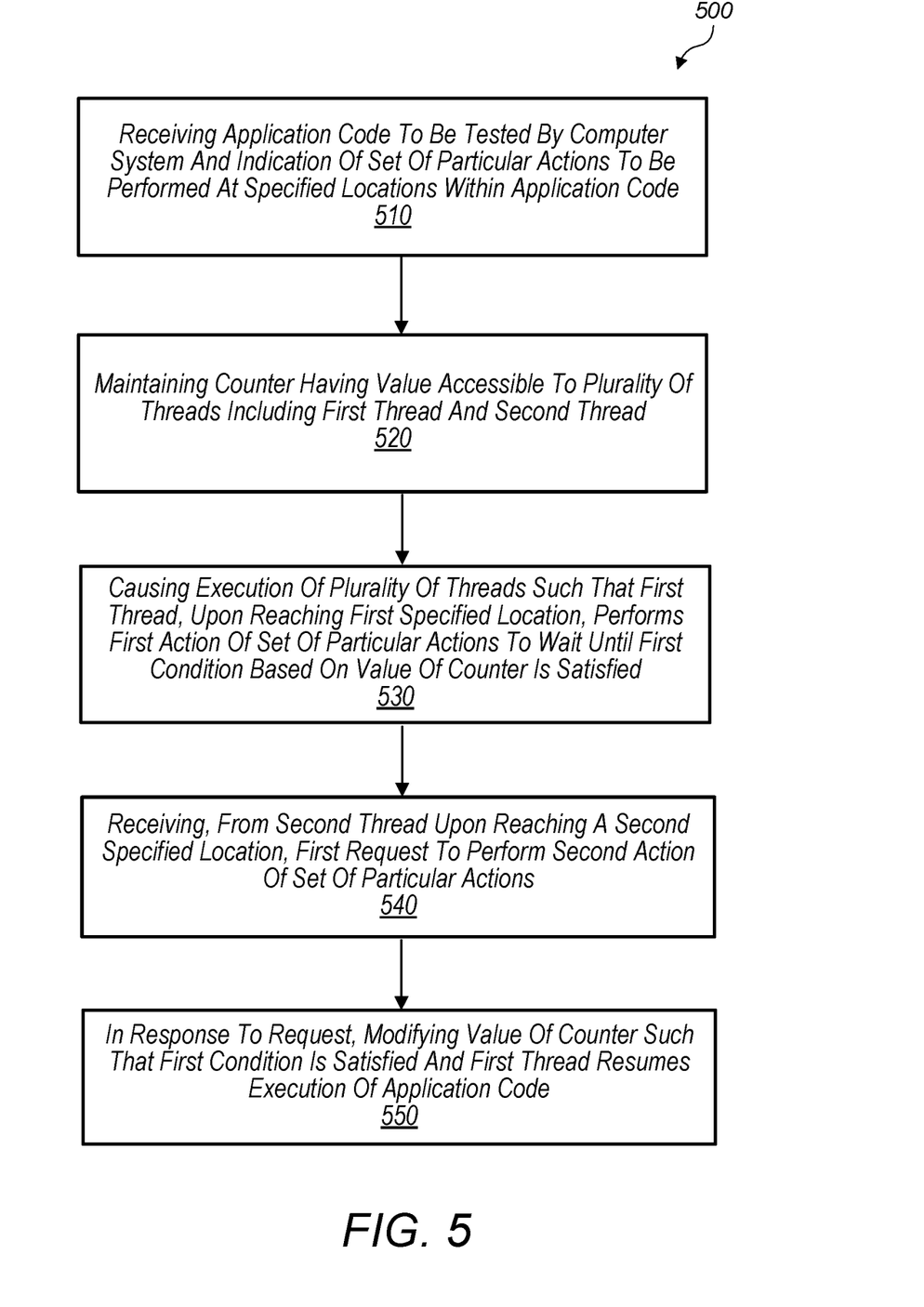

Turning now to FIG. 5, a flow diagram of a method 500 is shown. Method 500 is one embodiment of a method performed by a computer system such as system 10 to test application code (e.g., code 100). In some cases, performance of method 500 allows a user to test race conditions (e.g., by creating a narrow window where threads 121 may affect each other) and thus may be performed in response to a request from a user. In various embodiments, method 500 includes additional steps—e.g., creating multiple hash tables (e.g., 221).

Method 500 begins in step 510 with a computer system receiving application code that is to be tested and an indication (e.g., information 110) of a set of particular actions (e.g., actions 115) to be performed at specified locations (e.g., control points) within the application code. The indication may be distinct from the application code. In some embodiments, the computer system performs a test of the application code by performing the remaining steps of method 500. In some embodiments, performing the test of the application code is used to determine whether a race condition exists between the plurality of threads.

In step 520, the computer system maintains a counter having a value (e.g., value 235) accessible to a plurality of threads (e.g., threads 121) that include a first thread and a second thread. In various embodiments, the computer system maintains a table (e.g., table 225) for storing the set of particular actions. The computer system may index actions such as the first action into the table based on an identifier associated with the first specified location.

In step 530, the computer system causes execution of the plurality of threads such that the threads implement the software routine embodied in the application code. In some embodiments, the first thread implements a first portion (e.g., a set of methods/functions) of the application code while the second thread implements a second portion of the application code. In some embodiments, the first thread, upon reaching a specified location, performs a first action of the set of particular actions. In various embodiments, performance of the first action causes the first thread to wait until a first condition based on the value of the counter is satisfied. In some embodiments, the first thread may enter a loop in which the first thread iteratively checks whether the value satisfies the first condition. (In this manner, the first thread may be said to be waiting as it is not progressing beyond the specified location.) In such embodiments, the first thread exits the loop in response to the first condition being satisfied.

In step 540, the computer system receives, from the second thread upon reaching a specified location, a request to perform a second action of the set of actions. In some cases, the second action may include modifying the maintained value. In step 550, the computer system modifies the value of the counter in response to receiving the request from the second thread. In some cases, the value may be modified such that the first condition is satisfied and the first thread resumes execution of the application code.

Figure 6:
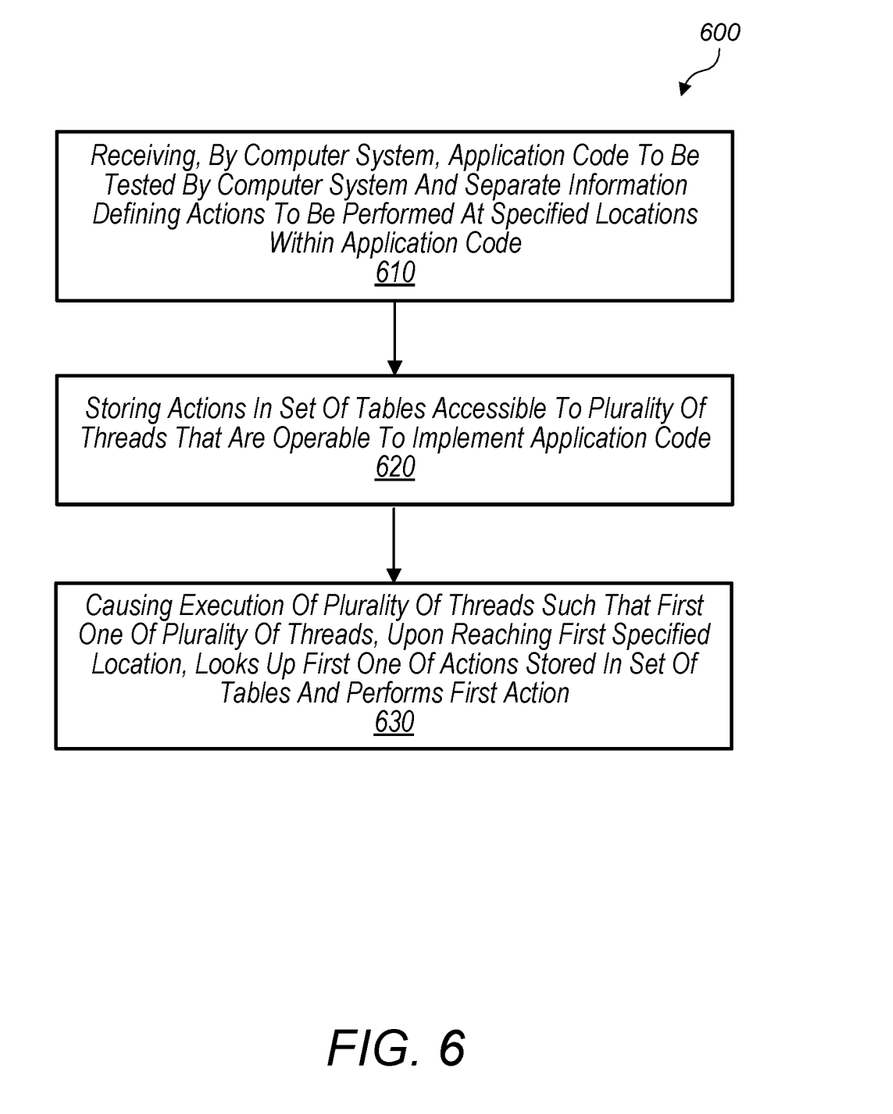

Turning now to FIG. 6, a flow diagram of a method 600 is shown. Method 600 is one embodiment of a method performed by a computer system such as system 10 to test application code (e.g., code 100). As with method 500, performance of method 600 may allow a user to test concurrency conditions and thus may be performed in response to a request from a user. In various embodiments, method 600 includes additional steps—e.g., creating multiple hash tables (e.g., 221).

Method 600 begins in step 610 with a computer system receiving application code to be tested and separate information (e.g., information 110) defining actions (e.g., actions 115) to be performed at specified locations (e.g., control points) within the application code. In various embodiments, the computer system may perform a test of the application code by carrying out the remaining steps of method 600.

In step 620, the computer system stores the actions in a set of tables (e.g., table 225) accessible to a plurality of threads (e.g., threads 121) that are operable to implement the application code. In some embodiments, first and second sets of the actions are associated with first and second threads of the plurality of threads, respectively. As such, the computer system may store the first set of actions in a first table of the set of tables that is associated with the first thread and the second set of actions in a second table of the set of tables that is associated with the second thread. The computer system derive an index value usable to store the first action in the first table by performing a hash derivation function (e.g., function 310) on an identifier corresponding to a first specified location. The identifier may include a first portion indicating a method of the application code and a second portion indicating where the first specified location is located within the method of the application code. (In various embodiments, the first table is accessible to the first thread, but not the second thread.)

In various embodiments, the computer system initializes a counter having a value (e.g., value 235) that is accessible to the plurality of threads. In some cases, a first action performed by the first thread includes requesting that the computer system modify the value of the counter. In response to receiving a request from the first thread, the computer system may modify the value of the counter in accordance with the request. In some cases, the second thread, upon reaching a second specified location, may cease progressing through the application code based on the modified value.

In step 630, the computer system causes execution of the plurality of threads. In some embodiments, the first thread, upon reaching a first specified location, looks up a first action of the actions stored in the set of tables and performs the first action. The first action may include requesting that the value of the counter be modified or sending an interrupt to a second thread that is sleeping in order to wake the second thread.

Figure 7:
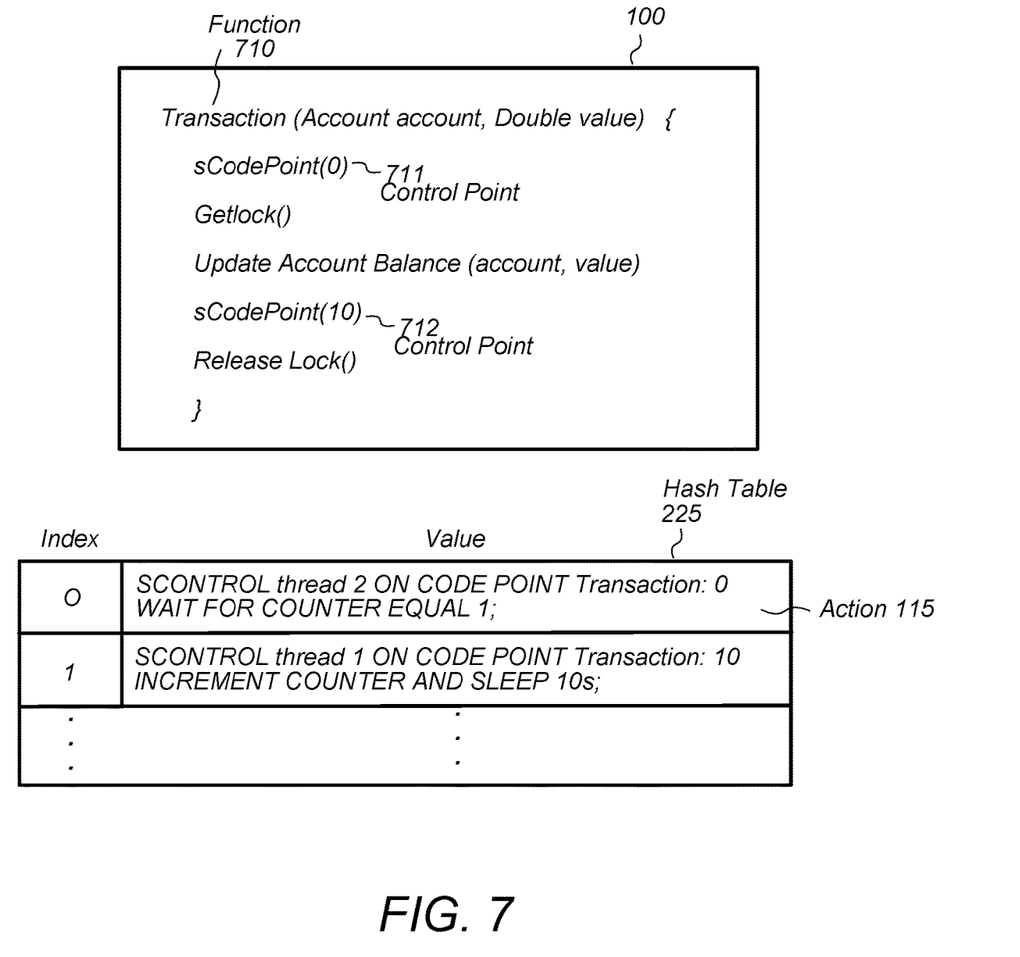
FIG. 7-8 are exemplary blocks of application code to be tested, according to some embodiments.

Turning now to FIG. 7, an exemplary block of code representing one portion of an embodiment of code 100 is shown. FIG. 7 further depicts an exemplary embodiment of a hash table 225. In the illustrated embodiments, code 100 includes a function 710 having control points 711 and 712, and a hash table 225 having two actions 115 indexed at entries "0" (hash key for 711—Transaction: 0, for example) and "1" (hash key for 712—Transaction: 10, for example). In some embodiments, control points 711-712 are tied to (or assigned during compiler pre-processing steps) globally (i.e., globally across code 100) unique identifiers (e.g., integers). For example, control point 711 may be assigned "<unique-id>: 10" (where <unique-id> is a unique value), which may be hashed to derive the index at which the corresponding actions 115 are stored. As such, the globally unique identifier may be used to distinguish control point 711 from other control points such as point 712.

In various embodiments, application tester 130 causes test environment 120 to spawn two threads 121 (referred to as thread 1 and thread 2 for FIG. 7) that perform the operations included in the function 710. In some cases, tester 130 performs a test of code 100 in response to a request from a developer as the developer may wish to test code that should cause thread 2 to retreat out of function 710 in response to thread 1 timing out without releasing a lock. In addition to causing the two threads to be spawned, tester 130 may populate table 225 with the two actions 115 shown and initialize a counter to have a value of '0'.

Initially, one of the two threads may enter into function 710 to begin performing the various functions defined therein (e.g., Getlock( ) Update Account Balance( ) Release Lock( ) etc.). When thread 1 enters into function 710 and reaches control point 711, it may attempt to retrieve any actions from table 225 that both correspond to control point 711 and pertain to thread 1. In this exemplary embodiment, control point 711 may map to index '0' of hash table 225 and thus, the hash table handler of table 225 may return no actions as the action stored at index '0' is associated with thread 2. As such, thread 1 may continue to progress through code 100 to the Getlock( ) function. When thread 2 enters into function 710 and reaches control point 711, it may also attempt to retrieve any actions from table 225. In this case, an action 115 may be returned to thread 2 that causes the thread to wait until the counter equals '1'.

When thread 1 reaches the next control point 712, it may attempt to retrieve any actions from table 225 that both correspond to control point 712 and pertain to thread 1. In this case, an action 115 may be returned to thread 1 that causes the thread to increment the counter and to sleep for 10 seconds. These actions may be part of an ordered set (e.g., 1) increment the counter and then 2) sleep for 10 seconds) in which actions are performed according to the ordering. In this exemplary embodiment, the action Increment Counter comes first in the ordering and thus is performed before the second action Sleep 10 s. At some point, thread 2 may retrieve the value of the counter and determine that it equals '1'. Accordingly, thread 2 may continue progressing through code 100 to the Getlock( ) function. Because thread 1 has the lock and has timed out for 10 seconds, thread 2 may attempt to retreat out of function 710. In setting up the test in this manner, the developer may determine whether their code has been implemented correctly to cause thread 2 to retreat in response to the lock being unavailable for a period of time.

Figure 8:
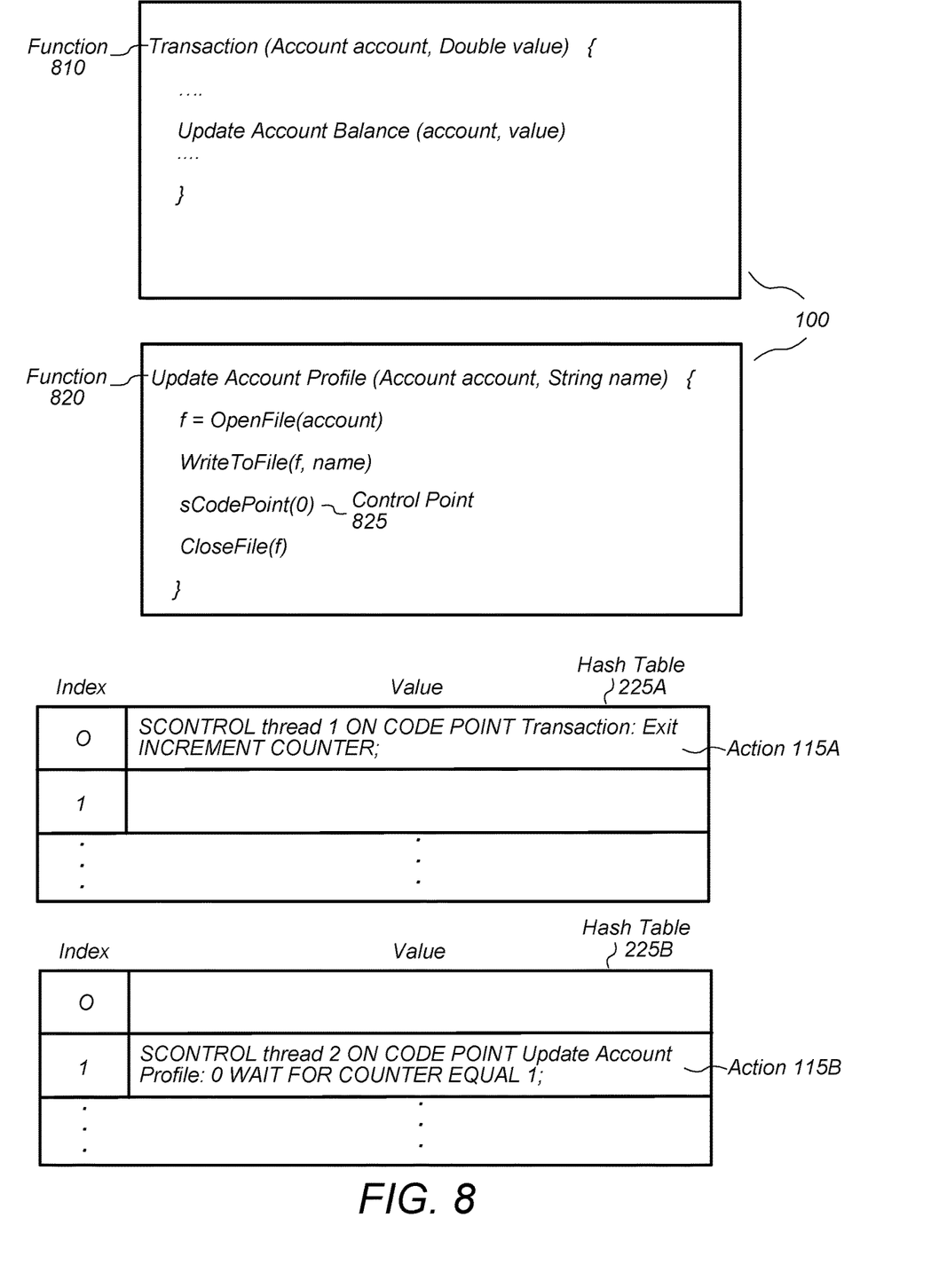

Turning now to FIG. 8, exemplary blocks of code representing two portions of an embodiment of code 100 are shown. Additionally, FIG. 8 depicts exemplary embodiments of hash tables 225A-B. In the illustrated embodiments, code 100 includes functions 810 and 820. Also as shown, hash table 225A includes an action 115A, and hash table 225B includes an action 115B. As with the example discussed in FIG. 7, Application tester 130 may cause test environment 120 to spawn two threads 121 (referred to as thread 1 and thread 2 for FIG. 8) where thread 1 performs the operations included in function 810 and thread 2 performs the operations included in function 820. In various embodiments, tester 130 also initializes a counter to have a value of '0' that is accessible to threads 1 and 2.

In executing application code 100 in a normal environment, a developer may notice that sometimes thread 1 fails to update the account balance of an account file. Unbeknownst to the developer, thread 2 may be updating the profile information in the same account file for a separate transaction and closing the file before thread 1 has finished writing to it. The developer may wish to test application code 100 to determine if the problem is a result of the interplay between threads 1 and 2. Thus, the developer may write actions 115A-B and cause tester 130 to perform a test of code 100.

In executing application code 100 in test environment 120, thread 2 may attempt to retrieve an action 115 upon reaching control point 825. In some instances, thread 2 may check hash table 225B, but not hash table 225A as table 225B may be the only table 225 that is associated with thread 2. In an exemplary embodiment, thread 2 retrieves action 115B as it corresponds to control point 825. Accordingly, thread 2 may perform action 115B, which causes itself to wait until the value of the counter equals '1'. At some point, thread 1 may enter function 810 and write to the account file to update the account balance. Upon exiting function 810, thread 1 may attempt to retrieve an action 115 and in an exemplary embodiment, retrieves action 115A and performs it to increment the counter. In response to the counter value being '1', thread 2 may then progress through the rest of function 820.

In preventing thread 2 from closing the account file before thread 1 has updated the account balance, the developer may determine that the account balance is being saved and that the problem has not occurred. The developer may iteratively run the test of code 100 to ensure that thread 2 is causing the problem. The developer may vary the test such that thread 1 waits to write to the account file until thread 2 has exited function 820. In doing so, the developer may observe the problem each time this new test is ran and thus, may determine that thread 2 is in fact closing the account file before thread 1 is finished.

Exemplary Computer System

Figure 9:
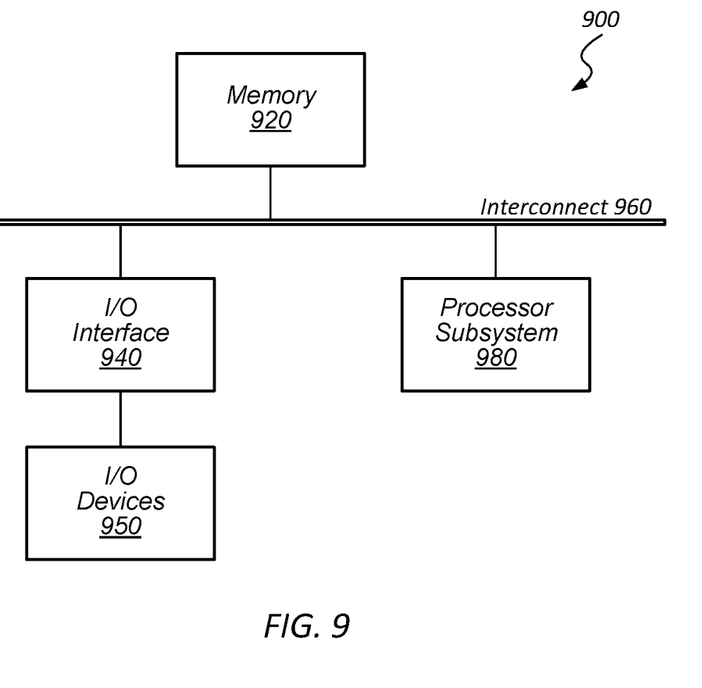
FIG. 9 is a block diagram illustrating an exemplary computer system, according to some embodiments.

Turning now to FIG. 9, a block diagram of an exemplary computer system 900, which may implement system 10 or tester 130, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Computer system 900 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented u121sing different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
receiving, by a computer system, a request to test application code;
performing, by the computer system, a test of the application code, wherein the performing includes:
populating a set of table structures with actions, ones of which are performable by threads to control a flow of other threads executing the application code, wherein the set of table structures is separate from the application code, and wherein a given table structure corresponds to a given thread; and
causing execution of a plurality of threads for the application code, wherein a first thread of the plurality of threads, upon reaching a specified location within the application code, is operable to look up a first action stored in a first table structure and perform the first action to control a flow of a second thread of the plurality of threads.

2. The method of claim 1, wherein the first table structure corresponding to the first thread includes a set of actions that is different than a set of actions included in a second, different table structure corresponding to the second thread.

3. The method of claim 1, wherein the second thread, upon reaching the specified location within the application code, is operable to look up a second action stored in a second, different table structure and perform the second action, and wherein the second action is different than the first action.

4. The method of claim 1, wherein the first thread looking up the first action includes:

hashing an identifier associated with the specified location to derive an index value; and
selecting, based on the derived index value, an entry of the first table structure that specifies the first action.

5. The method of claim 4, wherein the identifier includes a portion that identifies a function that includes the specified location and a portion indicative of where the specified location is within the function.

6. The method of claim 1, wherein the first thread looking up the first action includes selecting the first table structure from the set of table structures based on a thread identifier of the first thread that corresponds to the first table structure.

7. The method of claim 1, wherein the first table structure includes an entry storing a linked list of a plurality of actions that includes the first action, and wherein the first thread performs the plurality of actions.

8. The method of claim 1, wherein the application code includes an identifier that indicates the specified location, and the method further comprising:
before executing the application code in a normal environment, compiling the application code without the identifier; and
executing the compiled application code in the normal environment.

9. The method of claim 1, wherein the first thread implements a first portion of the application code and the second thread implements a second, different portion of the application code.

10. The method of claim 1, wherein the first action includes issuing an interrupt to cause the second thread to resume execution from a sleeping state.

11. A non-transitory, computer-readable medium having program instructions stored thereon that are capable of causing a computer system to perform operations comprising:
receiving a request to test application code;
performing a test of the application code, wherein the performing includes:
populating a set of table structures with actions, ones of which are performable by threads to control a flow of other threads executing the application code, wherein the set of table structures is separate from the application code, and wherein a given table structure corresponds to a given thread; and
causing execution of a plurality of threads for the application code, wherein a first thread of the plurality of threads, upon reaching a specified location within the application code, is operable to send an action request for a first action stored in a first table structure and perform the first action to control a flow of a second thread of the plurality of threads.

12. The medium of claim 11, wherein the operations further comprise:
receiving the action request from the first thread, wherein the action request specifies:
a thread identifier associated with the first thread; and
a location identifier associated with the specified location; and
using the thread identifier, selecting the first table structure from the set of table structures.

13. The medium of claim 12, wherein the operations further comprise:
hashing the location identifier to derive an index value;
identifying an entry of the first table structure based on the index value; and
returning the first action from the identified entry of the first table structure.

14. The medium of claim 12, wherein the operations further comprise:
  receiving action information that is separate from the application code, wherein the action information identifies a plurality of actions, and wherein the set of table structures are populated with actions based on the action information.

15. The medium of claim 12, wherein the performing further includes:
  instantiating a value that is accessible to ones of the plurality of threads for controlling a flow of other ones of the plurality of threads executing the application code.

16. A method, comprising:
  receiving, by a computer system, a request to test application code;
  populating, by the computer system, a first table structure with a set of actions performable by a first thread and a second table structure with a different set of actions performable by a second thread; and
  causing, by the computer system, execution of the first and second threads to implement a set of portions of the application code, wherein the first thread, upon reaching a specified location within a first portion of the application code, is operable to perform a first action stored in the first table structure to control a flow of the second thread.

17. The method of claim 16, wherein the specified location is associated with an identifier that can be hashed to derive an index value for identifying the first action from the first table structure.

18. The method of claim 16, wherein the second thread implements a second, different portion of the application code than the first portion implemented by the first thread.

19. The method of claim 16, wherein the second thread implements the first portion of the application code as the first thread.

20. The method of claim 19, wherein the second thread, upon reaching the specified location within the first portion of the application code, is operable to perform a second action stored in the second table structure associated with the second thread.

* * * * *